W. COUSENS.
Potato-Planters.

No. 149,642.            Patented April 14, 1874.

UNITED STATES PATENT OFFICE.

WILLIAM COUSENS, OF UPPER STILLWATER, MAINE.

IMPROVEMENT IN POTATO-PLANTERS.

Specification forming part of Letters Patent No. 149,642, dated April 14, 1874; application filed November 24, 1873.

*To all whom it may concern:*

Be it known that I, WILLIAM COUSENS, of Upper Stillwater, in the county of Penobscot and State of Maine, have invented certain new and useful Improvements in Potato-Planters; and I do hereby declare that the following is a full, clear, and exact description thereof that will enable others skilled in the art to which it appertains to make and use the same, reference being had to the accompanying drawings and to the letters of reference marked thereon, which form a part of this specification, in which—

Figure 1:
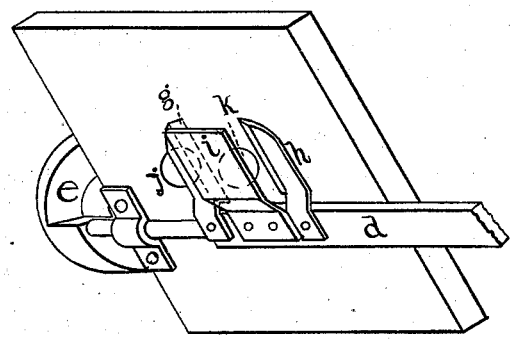
Figure 2:
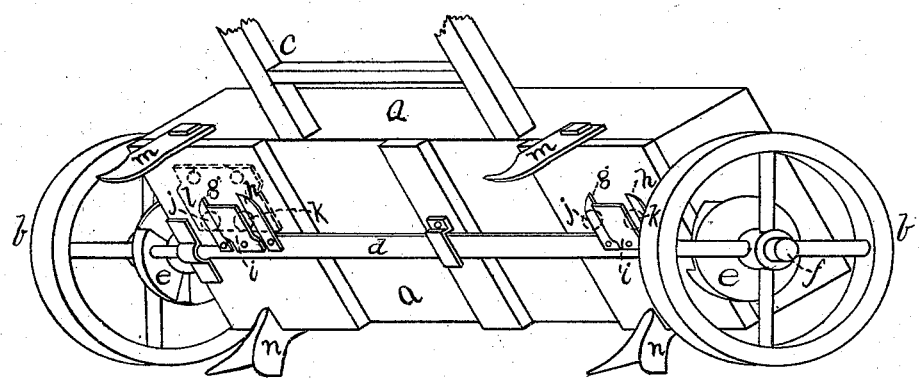

Figure 1 shows a detail perspective view of cam, cutters, and rest, and Fig. 2 an inverted perspective view of hopper, cutter-bar, wheels, &c.

My invention consists of devices, combined in one machine, for making the furrow, slicing and planting the potato, and covering it over. The slicing and dropping are performed automatically, the power being derived from the forward motion of the machine. Several rows may be planted at the same time by increasing the number of cutters and openings; but for purposes of illustration I have chosen a two-row planter.

My devices will be more readily understood by reference to the drawing.

At $a$ is shown the box or hopper, in which the potatoes are placed, provided with wheels $b\ b$ and shafts $c$, by which it may be drawn. Across the bottom of this hopper extends a sliding bar, $d$, receiving its motion from cams $e\ e$ attached to the axle $f$, and revolving with it. This bar carries knives $g\ g\ h\ h$, by which the potato is sliced, and rests $i\ i$ to support the potato while being cut and to regulate the thickness of the slice, which will be in proportion to the distance of the rest from the cut of the knife. The potato is presented to the knives through openings $j\ j\ k\ k$ in the bottom of the hopper, the motion of the machine being sufficient to shake them down. They drop through these openings and lodge upon the rests while the advancing knives slice them, the rests at the same time sliding from under and allowing them to drop into the furrow. If desired, a clearer, as shown in dotted lines at $l$, may be employed. It has holes corresponding to the openings in the hopper, to which it is attached in such a manner as to allow the knives to slide between them. This insures the removal of the slice from the rest, holding it stationary when the rest is removed.

As will be observed, the slicers are arranged in pairs, their edges facing each other, the knives cutting alternately as the bar slides to and fro.

The knives at $g\ g$ cut the potatoes fed through the openings $j\ j$, while those at $h\ h$ cut those presented through the openings $k\ k$. At $m\ m$ are the furrowing-points, attached to the machine directly in front of the planting devices, and $n\ n$ are the devices for covering the furrow.

What I claim as my invention is—

1. In combination with the hopper $a$, having the openings $j\ j\ k\ k$ therein, the knives $g\ g\ h\ h$ and rests $i\ i$, mounted on the bar $d$, and receiving a reciprocating motion from cams $e\ e$, substantially as set forth and shown.

2. In combination with the elements of above claim, the furrowers $m\ m$ and coverers $n\ n$, arranged as set forth.

In testimony that I claim the foregoing, I have hereunto set my hand this 21st day of November, 1873.

WM. COUSENS.

Witnesses:
W. E. BROWN,
WM. FRANKLIN SEAVEY.